Patented Mar. 20, 1934

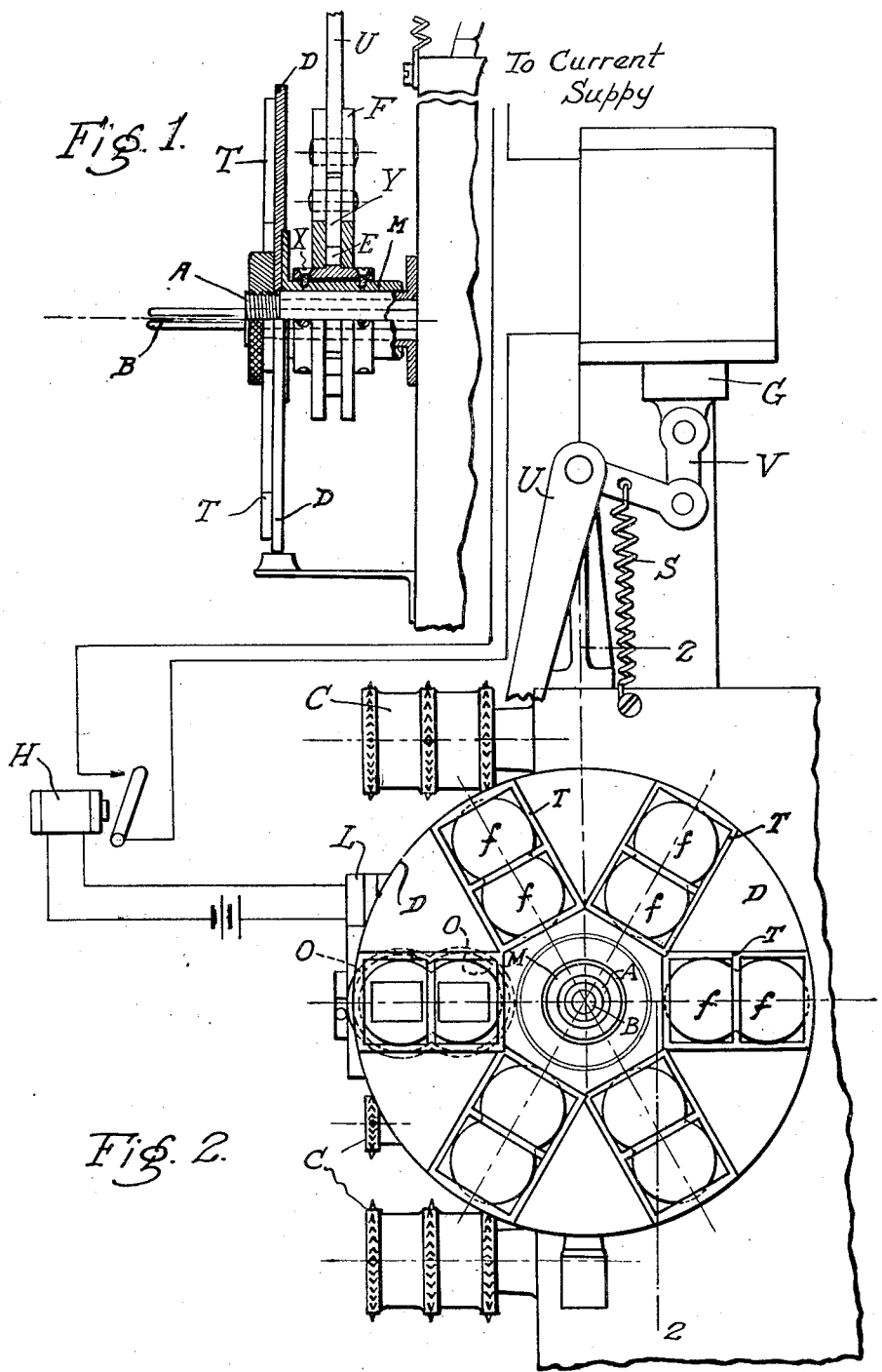

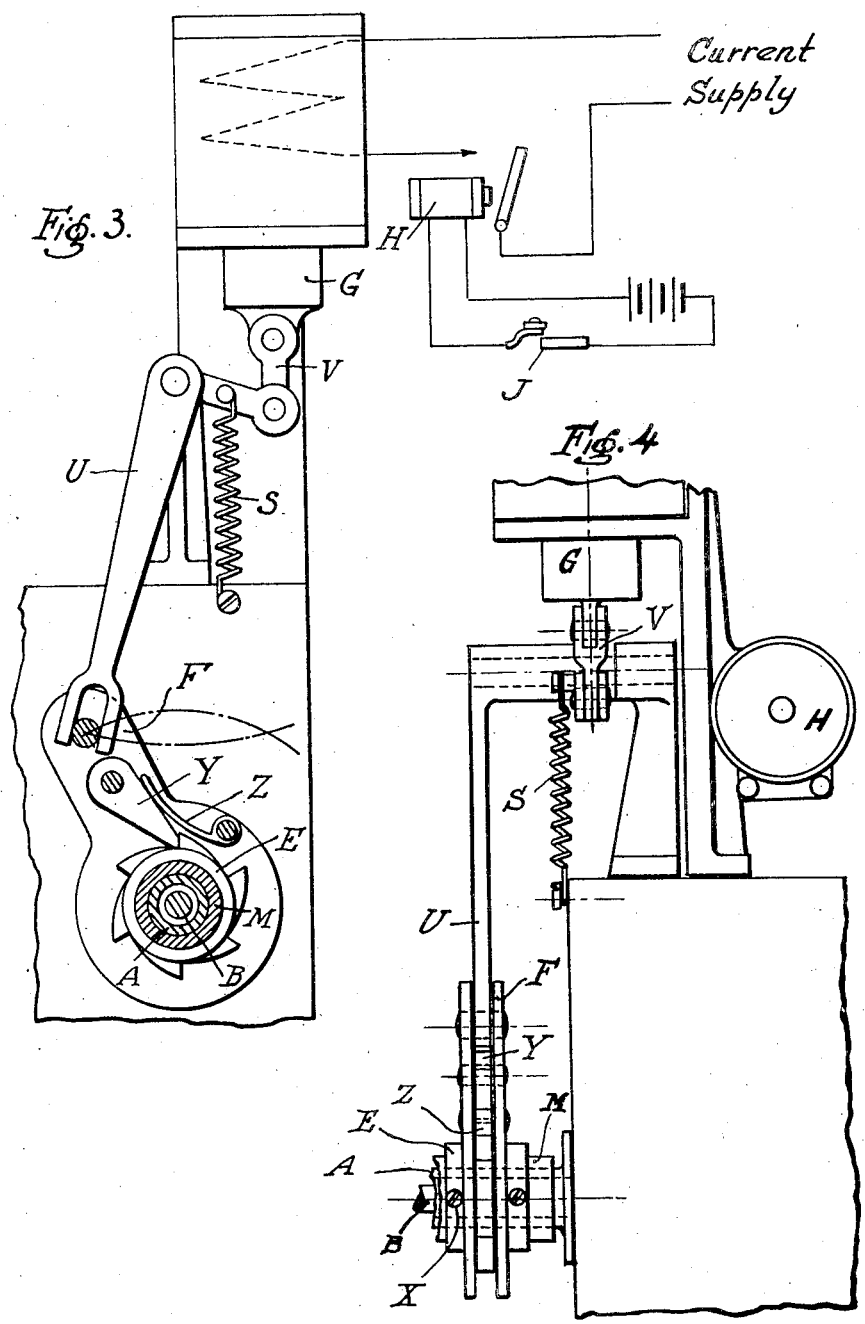

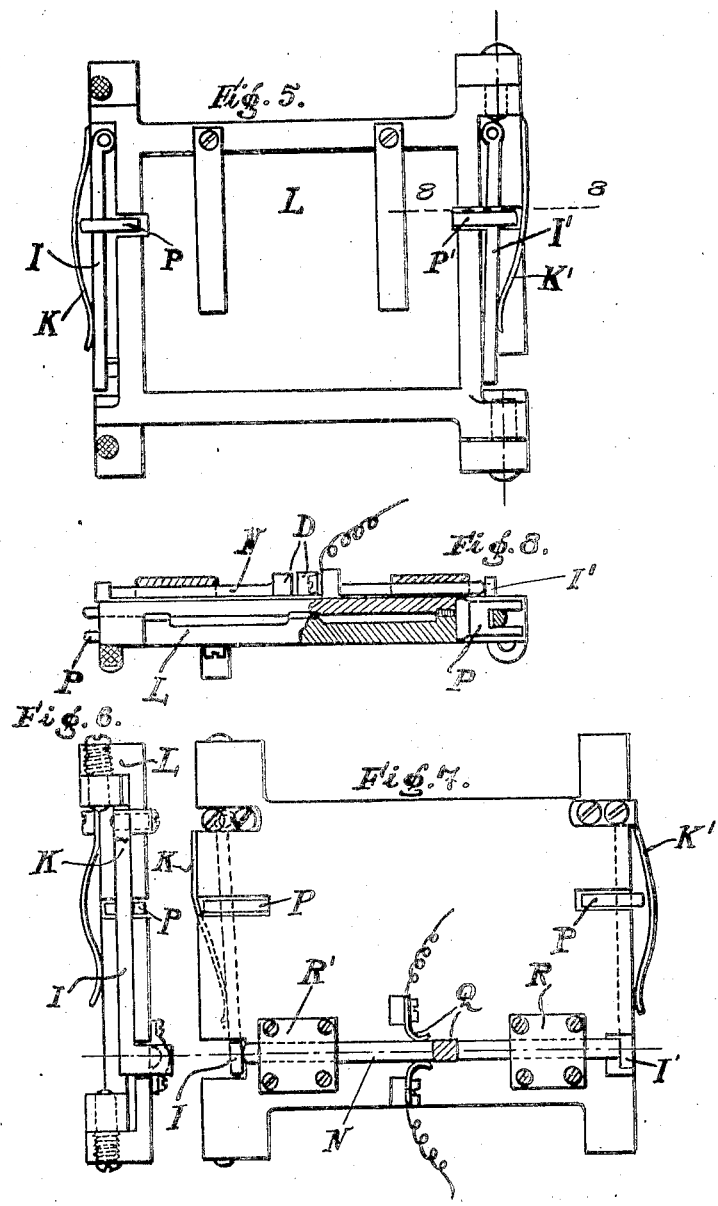

1,951,693

UNITED STATES PATENT OFFICE 1,951,693

SYSTEM FOR COLORED CINEMATOGRAPHIC PROJECTION BY ADDITION SYNTHESIS

Gualtiero Gualtierotti, Milan, Italy

Application May 19, 1931, Serial No. 538,581
In Italy June 18, 1930

3 Claims. (Cl. 88—16.4)

It is already known how to obtain the reproduction of colors in the cinematographic projections by means of addition-synthesis through which two or more monochrome selective images obtained are projected on the screen and accurately superposed to each other, the respective color having been imparted to each of the said images.

The coloring is generally obtained by means of color filters placed on the light path before or after the passage of the light through the objective.

In the case of bichromatic systems, the reproduction of the colors in the synthesis operation is not so easy and true as with trichromatic systems, and even if by the use of special filters it is practicable to get from a single determined pair of filters a satisfactory general reproduction of the colors, yet it is impossible to avoid the appearance of certain deficiences, especially for some tonalities.

It has been found that, according to the subjects and colors of the originals, it is desirable to alter the tonality and intensity of the projection filters to suit the color or colors that prevail in the originals to be reproduced.

In the case of the cinematographic projection during which various and different scenes and subjects follow one another without interruption it would not be feasible to stop the machine in order to change the filters every time the subject requires the changing of the light colors.

To comply with the requirements in a practical manner it is necessary that the replacement of the filters may be effected at the proper predetermined moments automatically, without stopping the machine and without interrupting the projection.

The present invention, solves the problem by providing a suitable set of filters arranged in pairs, each pair being suitably mounted on a support which is so designed that by its revolving or travelling motions it brings the various pairs into operative position.

The support is also so arranged that rotation thereof is automatically brought about by electric devices actuated at the proper moments by means of a push-button switch.

A further object of the invention is to provide means whereby the device will be operated automatically so that the full attention of the attendant will not be necessary at all times.

The invention is clearly illustrated in the accompanying drawings, in which:—

Fig. 1 is a side elevational view the top half thereof being a section on the line 2—2 of Fig. 2.

Fig. 2 is a front view of the invention the parts being broken away and also showing diagrammatically the automatic electrical means for controlling the movement of the step by step means.

Fig. 3 is a front elevational detail showing diagrammatically the manually controlled electrical means for regulating the movement of the step by step means.

Fig. 4 is a side view of the arrangement shown in Fig. 3.

Fig. 5 is an enlarged front elevational detail of the automatic electrical control means.

Fig. 6 is a side view thereof.

Fig. 7 is a rear elevational view of the same, and

Fig. 8 is a plan view partly in section on the line 8—8 of Fig. 5.

The system comprises an objective O—O as used for the projections, this objective being adapted to so project two images arranged side by side that they accurately overlap one another on the screen.

D is a metal disc adapted to revolve about the spindle A and provided with sets of windows f—f, arranged in pairs which, upon rotation of the disc, are brought in front of the objective in succession. Special frames T—T—T . . . are provided to retain suitably colored filters in the said windows, so that the rays issuing from the objective pass through said filters and take up the color thereof.

Film operating and guide rollers C are mounted on the frame of the apparatus.

For practical reasons the axis of the disc D, in the example shown, is made to coincide with the axis of the shutter of the projection machine. The spindle B (Figs. 1 to 4) of the shutter traverses freely and coaxially the hollow spindle A, which serves as a support and rotation center for the disc D.

The hub M of the disc D (Figs. 1, 3, 4) carries a ratchet-wheel-and-pawl device which serves to impart to the disc the rotating movements required to bring the various filter windows in succession into operative position. The ratchet-wheel-and-pawl device includes a toother hub E fixed to hub M by fasteners X, an arm F loose on hub E and having a pawl Y pivoted thereon and yieldingly held in engagement with the toothed hub E by spring Z and the device is actuated by the arm F (Figs. 3 and 4) connected through a pivoted bell crank lever U and a link V to the electromagnet G. A spring S is connected to the lever U to maintain proper engagement between it and the arm F. The current impulses are supplied to the electromagnet at determined moments by closing its circuit by means of the relay H.

The relay H in its turn is controlled by the current impulses supplied thereto by means of a push-button switch J operated at the proper moments.

Obviously the object in view may be realized also with a different arrangement of the mechanisms and electric circuits; the device is also applicable to projection apparatus of trichromatic or four-chromatic systems, or of bichromatic system with the pictures arranged one behind the other instead of side by side.

The device according to Figs. 2 and 5 to 8, essentially comprises a film guide frame generally designated by the letter L and the film is passed through the frame before entering the projecting apparatus or after issuing therefrom. The frame L should therefore be arranged on the projecting apparatus to suit. As shown in Fig. 2 the frame L is arranged above the projecting apparatus.

On each side of the frame movable abutments P P' respectively, are arranged, the inner ends thereof remaining in contact with the adjacent edge of the film while the other ends are connected respectively to levers I and I', the two levers being constantly urged inwardly by the springs K and K'. The lower ends of the two levers bear against the adjacent ends of a spindle N which is adapted to slide in the support R and R'. The spring K' is slightly stronger than the spring K, so that, in inoperative conditions, the spindle N is pushed into the position indicated on the drawings and in this position the electric contact Q remains open.

When the film is travelling in the frame L, the two abutments P and P' maintain the two levers I and I' in such a position that the levers do not act on the spindle N.

At the moment when it is desired that the replacement of the filters should take place (this moment corresponding to a given point of the film) a notch is formed in the film edge adjacent to the abutment P, the notch being about ½ mm. deep and about 30 mm. long and suitably curved at the ends.

When, during the travel of the film, the notch comes to face the abutment P, this abutment, being pressed against the edge of the notch by the spring K, moves inwardly and is of course followed by the lever I which with its bottom end pushes the spindle N in such a manner as to close the electric contact Q. This closure causes a current impulse to be sent into the relay H controlling the electromagnet G described above.

A certain duration of the closure of the relay circuit is, required for the current to the electromagnet being established and the working of the device being secured; at the end of this duration the contact Q must again be opened.

This is obtained by means of a second notch provided on the opposite edge of the film and at such a distance from the previously named notch as corresponds to the distance travelled by the film in the said interval. When the second notch comes to face the abutment P', this abutment moves inwardly and brings about a similar movement of the lever I' which, striking the adjacent end of the spindle N, moves this spindle to the left and opens the contact Q.

In this manner the device is again ready for an eventual further operation.

Having now particularly described and ascertained the nature of my said invention and in what manner the same is to be performed, I declare that what I claim is:—

1. In combination with a projecting machine, of a disc rotatable about the shutter shaft of the machine, said disc having a plurality of pairs of light filters carried thereby, means for imparting a step-by-step motion to the disc to intermittently move the filters at predetermined intervals during projection, and electrical means for controlling the movement of the step-by-step means.

2. A device as claimed in claim 1 wherein a relay is provided to control the step-by-step motion of the disc, and a manually operated button for controlling the operation of the relay.

3. The combination with a projecting machine and its film, of a guide for the film, a disc rotatable about the shutter shaft of the machine and having a plurality of pairs of light filters carried thereby, an electromagnet for imparting a step-by-step movement to the disc, a relay in circuit with the magnet, movable abutments carried by the guide and engageable with the longitudinal edges of the film passing through the guide, levers connected with the abutments, a contact spindle engageable with the levers, and means on the longitudinal edges of the film for controlling the movement of the spindle to actuate the relay, and thus the magnet, as and for the purpose set forth.

GUALTIERO GUALTIEROTTI.